Sept. 26, 1950 N. FELICI 2,523,689
ELECTROSTATIC MACHINE
Filed Jan. 23, 1947 4 Sheets-Sheet 4

INVENTOR.
Noel Felici
BY George H. Corey
ATTORNEY

Patented Sept. 26, 1950

2,523,689

UNITED STATES PATENT OFFICE 2,523,689

ELECTROSTATIC MACHINE

Noel Felici, Grenoble, France, assignor to Centre National de la Recherche Scientifique, Paris, France, a public establishment of France Application January 23, 1947, Serial No. 723,730
In France September 20, 1945

Section 1, Public Law 690, August 8, 1946
Patent expires September 20, 1965

15 Claims. (Cl. 171—329)

The present invention relates to electrostatic machines having conductive members movable relative to each other for inducing the electric charge and more particularly to machines of the Toepler type.

In the following description the terms "inductors" or "inductor electrodes" designate the stationary or movable members of such a machine which, during the operation of the machine, are maintained at given potentials by means of one or several external sources of electricity, these members cooperating with "carriers" or "carrier electrodes" which are formed of conductive material and are supported for relative movement with respect to the inductor electrodes.

In electrostatic machines having movable conductive members, when the dielectric strength of the fluid medium in which said machines operate is utilized up to a maximum, the minimum thickness of the fluid dielectric separating the carrier electrodes from the inductors must be greater the higher the potential difference which is to be maintained at the output terminals of the machine. The increase of this thickness has for its effect to reduce up to a certain degree the maximum electric field strength allowable in the fluid dielectric, which correspondingly reduces the specific power output proportional to the square of this field.

Simultaneously with the minimum thickness of the fluid dielectric it is necessary, as disclosed in my copending application Serial No. 646,737, filed February 11, 1946, now Patent No. 2,486,140, October 25, 1949, to increase the thickness of the movable conducting members which, however, brings about an increase of the frictional losses in the fluid dielectric and some reduction of the power output due to the increase of the interference or stray capacities.

The present invention makes it possible to obviate these drawbacks and to produce electrostatic machines having movable conductive members which are constructed rationally and yield very high voltages with specific power output and efficiency which are as good as those of machines yielding a comparatively reduced voltage.

According to the invention, high potential differences are obtained between the output terminals of a machine with a reduced thickness of the dielectric separating the carrier electrodes from the inductors by arranging, after the normal inductor in the direction of rotation of the machine, considered when working as a generator, a series of auxiliary inductors brought to potentials above the potential of the normal inductor and increasing from the normal inductor and from one auxiliary inductor to the next and such that the potential difference between a carrier electrode and the nearest inductor remains not greater than the maximum consistent with operating safety, that is, the maximum consistent with the operation of the machine without discharge between such carrier and the inductor. The potential of the carrier electrode is successively increased and at a selected point in the movement thereof out of registering inductive relation to a predetermined auxiliary inductor electrode which is at a potential higher than the lowest potential of the series of auxiliary inductors this carrier is connected to an output terminal of the machine. The potential of the carrier upon such connection is higher than the potential of the predetermined auxiliary inductor electrode. The potential difference between the carrier and the electrode at the selected point, however, may be not greater than the maximum allowable potential difference above referred to.

The output voltage of such an improved electrostatic machine thus can greatly exceed the output voltage of a machine constructed according to known principles and in which the thickness of the fluid dielectric between inductor and carrier electrodes would be the same.

Simultaneously with the so obtained voltage increase it is possible to obtain an increase in the intensity of the current supplied by the machine and, consequently, a new increase of the power output by combining with the above described arrangement, the arrangement provided for in my application for Patent No. 723,729 filed January 23, 1947, now Patent No. 2,519,554, issued August 22, 1950. The arrangement of that application consists, in addition to the normal inductor or inductors, of one or several auxiliary inductors which exert their electrical influence upon the carrier electrodes to produce the desired output potential when these carrier electrodes are brought into electrical connection with the collector or output terminal of the machine and which to this end are maintained at given potentials of such sign and value that these inductors, through their influence upon the carrier electrodes, withdraw from the load through the output or collector terminal of the machine electricity of a sign opposite to that of the electricity collected from the carrier electrodes by the collector terminal and delivered to the load circuit. The potential of the carrier at the selected point of connection to the terminal in this arrangement is higher than the potential of the predetermined auxiliary inductor electrode above referred to but is less than the potential of the auxiliary inductor which effects the withdrawal from the load of electricity of opposite sign. Preferably such connection of the carrier to the terminal is effected when the carrier is in part in inductive relation to the auxiliary electrode of highest potential of the series and in part in inductive relation to the auxiliary electrode which is at the next lower potential, so that the potential of the carrier is less than the highest potential of the series of auxiliary electrodes but greater than the next lower potential.

Further to determine the potentials and to limit the difference in potential to the maximum above referred to additional auxiliary inductors are arranged after the series of inductors of increasing potentials in the direction of rotation of the machine working as a generator, the potentials of these additional auxiliary inductors decreasing from one auxiliary inductor to the next in the same direction and the first inductor of this second series exerting its influence upon the carrier electrodes when the latter are brought into electrical connection with the collector or output terminal, the sign as well as the value of the potential to which this first inductor of this series is brought being such that this inductor, through its influence upon the carrier electrodes, attracts electricity from the load circuit of a sign opposite to that of the electricity collected by the collector and delivered to the load circuit as above indicated.

The alternation of the so-formed two series of inductors may be repeated several times for a single revolution of the machine, the members adapted for causing the carrier electrodes to be connected in succession to the terminals of the machine being multiplied in a corresponding manner.

Two simple embodiments of the electrostatic machines of the Toepler type constructed according to the invention are shown in the appended drawings in which Fig. 1 is a diagrammatic perspective view of a machine comprising a series of inductors maintained at increasing potentials;

Figure 1:
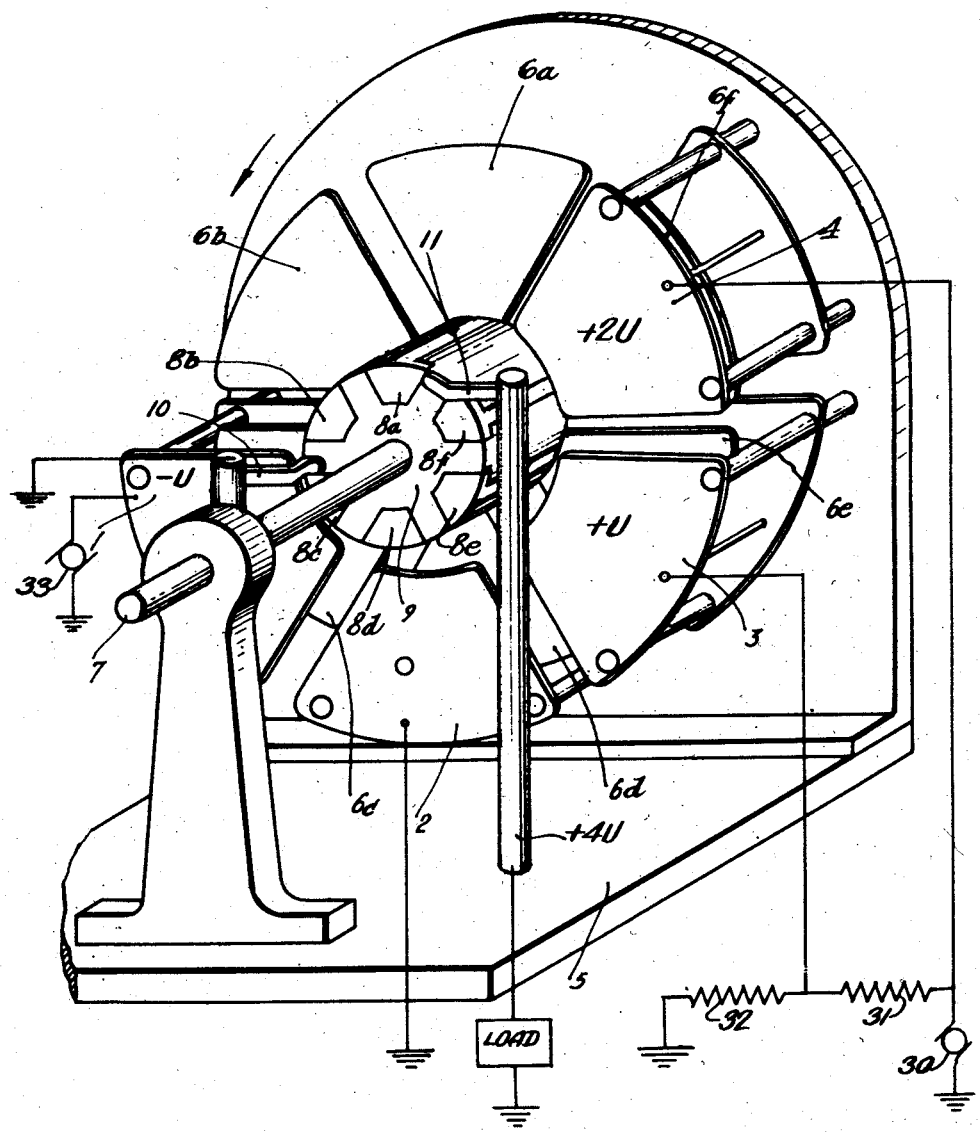
Figure 3:
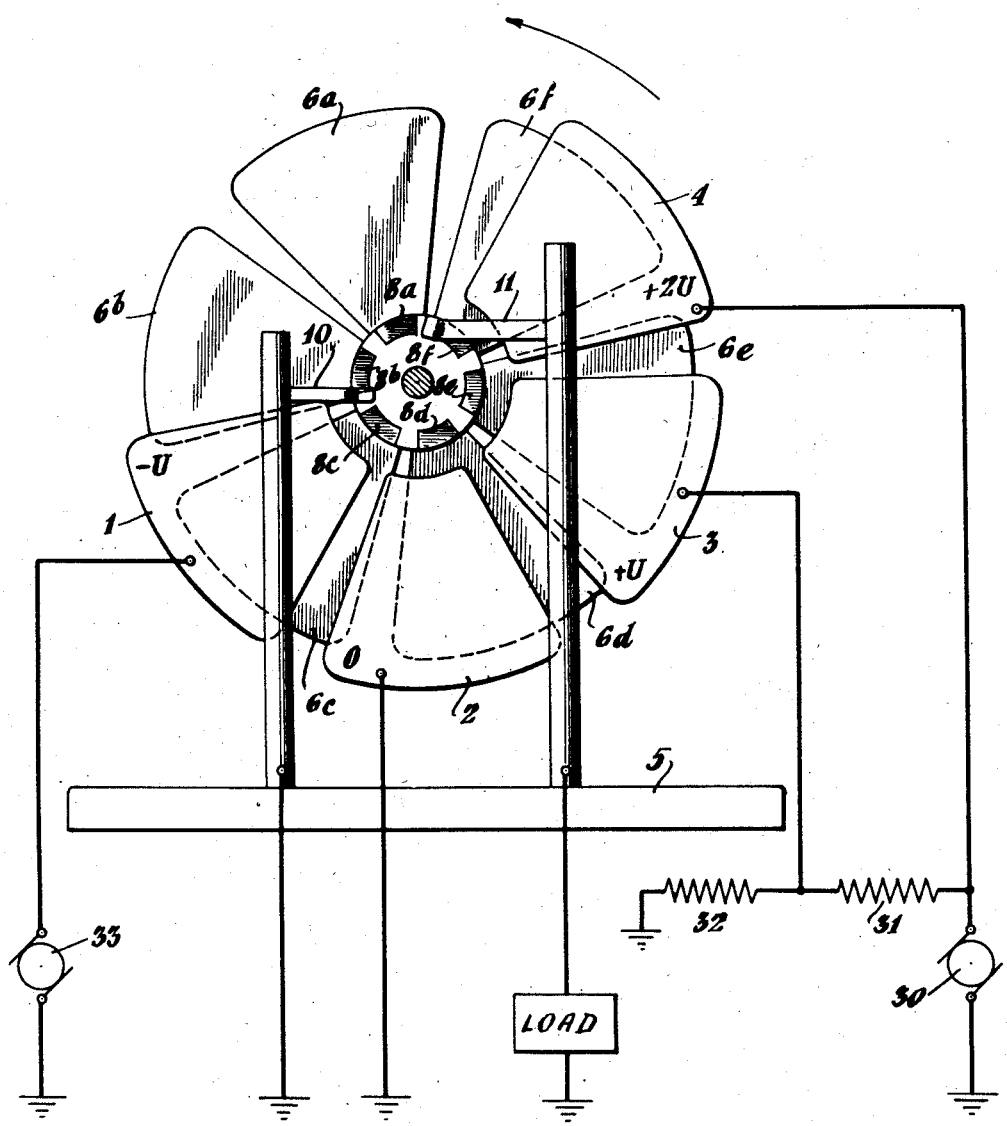
Fig. 3 is a diagrammatic elevational view of the machine of Fig. 1, showing the moving electrodes thereof in a particular angular relation to the stationary electrodes.

The machine shown in Fig. 1 comprises four inductors 1, 2, 3, 4 each formed of two parallel conductive blades secured in an insulated manner to the frame 5 of the machine and six carrier electrodes, 6a, 6b, 6c, 6d, 6e, 6f, each formed of a conductive material and mounted in an insulated manner upon shaft 7 of the machine which is journalled in bearings carried by frame 5. Each carrier electrode 6a—6f is electrically connected with a corresponding conductive sector 8a—8f embedded in the end face of an insulating cylinder 9 keyed on shaft 7, the arcuate extent of each sector 8 being the same as that of the corresponding carrier 6. The sectors 8 cooperate with two brushes 10 and 11 carried in an insulated manner by frame 5. Brush 10 which is grounded through one terminal of the machine is arranged so as to engage a sector 8 when the corresponding carrier 6 begins to engage between the blades of inductor 1, as shown in the case of carrier 6b and sector 8b in Fig. 3, and brush 11 which is connected to the other terminal, herein referred to as the output terminal of the machine, is arranged so as to engage sector 8f shortly after the corresponding carrier 6f has begun to come out from between the blades of the inductor 4, as shown in Fig. 3, the movable parts rotating counter-clockwise in Figs. 1 and 3.

The machine works as a generator in the following manner:

$2U$ being the maximum potential difference which can exist during normal operation of the machine without discharge between an inductor and the nearest carrier electrode, the inductors 1, 2, 3 and 4 are maintained at the potentials $-U$, $O$, $+U$ and $+2U$, respectively by a suitable excitation arrangement such as that illustrated diagrammatically in the drawing. These potentials are selected merely by way of example for purposes of illustration and are correspondingly shown in the drawing upon the respective inductors.

When a carrier electrode 6 engages between the blades of inductor 1 it is grounded through the medium of the corresponding sector 8 and of brush 10 and it takes a charge approximately equal to C. U., C being the maximum capacity which can be formed by a carrier electrode and an inductor. When the carrier electrode under consideration begins to move out of registration with this inductor its connection with the ground is cut off and its potential rises, this increase continuing owing to the fact that the carrier passes successively between the blades of the inductors 2, 3 and 4 which are at successively increasing potentials. When this carrier is in full registration between inductors 2 which are at potential $0$, its potential is $+U$; when it is between inductors 3 which are at potential $+U$ its potential is $+2U$ and, finally, when it leaves inductors 4 which are at potential $+2U$ its potential still rises above $+3U$, tending towards $+4U$. It is to be noted, however, owing to the arrangement which has been adopted, that the potential of a carrier reaches this high value without developing between an inductor and the carrier or carriers which are between the blades of the inductors a potential difference exceeding the allowable maximum value $2U$.

When the above considered carrier has reached a potential of nearly $+4U$ during its movement out from between the blades of inductor 4 it is connected to the collector or output terminal of the machine by means of the corresponding sector 8 and brush 11, the position of the brush 11 being suitably determined for this purpose. This connection lasts until the carrier has entirely moved out of inductive relation to inductor 4. Thus, through the collector terminal the load circuit receives the charge brought by the carrier under a potential which can reach $+4U$ instead of being limited to $+U$ as in the case of an ordinary machine, this being accomplished with the same dielectric interval between inductor and carrier. When the connection of the carrier with the collector has been broken the potential of the carrier falls rapidly as soon as this carrier comes near inductor 1 which is at the potential $-U$. The carrier is then grounded again and the cycle is repeated.

The values of the potentials to which the various inductors are brought was indicated above only by way of a simple example and it is possible to choose for said inductors other potentials. Thus, the application of the invention may be varied in many manners. It is possible, for instance, to choose for the inductors potentials which are not whole multiples of U. If the first inductor 1 is brought to a potential $-V$ different from $-U$ and if a parameter $k$ is defined by the equation $2U=kV+V$, the potentials of the other inductors may be, in the first approximation: $kV-V$ for inductor 2, $2kV-V$ for inductor 3 and $3kV-V$ for inductor 4. Thus a carrier in inductive relation to inductor 1 takes a charge approximately equal to C.V and its potential becomes $kV$ when it is in inductive relation to inductor 2, $2kV$ when it is in inductive relation to inductor 3 and so on. The potential difference between an inductor and the carrier or carriers which are between the blades forming the same, therefore, never exceeds $2U=kV+V$ provided that the voltage of the receiving apparatus or load is not higher than $4kV$ in the embodiment of Fig. 1. The current output of the machine depends upon the value chosen for factor $k$. It will be understood that the current is proportional to $2/k+1$ and the maximum voltage to $2k/k+1$, so that the power output is proportional to $4k/(k+1)^2$ which quantity is maximum for $k=1$. Due to the effects of stray capacities, the maximum output power generally is obtained for a value of $k$ which is less than 1.

It is also possible to add the same constant to all the potentials which have been indicated. If this constant is $-2kV$ the machine has two terminals at potentials near $+2kV$ and $-2kV$. If the constant is $-4kV$ the machine has one terminal at the potential $-4kV$ and the other at the potential 0. If the constant has any other value the output terminals of the machine are at other asymmetrical potentials the difference between which is always $4kV$.

The energization of inductors 1, 2, 3, 4 may be obtained by any known means. One may use, for instance, auxiliary generators which may be rationally constructed machines of the Toepler type having a small power output. When using one or more voltage dividers of the resistor type the number of auxiliary generators which are used can be, for example, reduced to two, both said generators supplying the extreme potentials $-V$ and $3kV-V$, the intermediate potentials being supplied by the voltage dividers.

As shown in Fig. 1, for example, the exciter 30 which may be a direct current generator capable of developing a potential of $+2U$ with respect to the ground is connected to the inductor 4 to maintain this inductor at a potential $+2U$. This exciter is connected through the resistor 31 to the inductor 3 at a potential $+U$ and further to ground through the resistor 32. The inductor 2 is connected directly to ground and the exciter 33 is connected between the inductor 1 and ground, this exciter being capable of producing a potential of $-U$ with respect to ground.

The energization of the inductors, the potential of which is comprised between 0 and $+4kV$, may also be taken from the main machine either by dividing the output voltage which is equal to $+4kV$ with respect to ground by means of a voltage divider of the resistor type or by using auxiliary brushes engaging the carrier electrodes at the moment when their potential is equal to that of the inductor to which each brush is connected. For obtaining any intermediate voltage between the output voltage and 0 it is sufficient to arrange an insulated brush engaging a sector 8 connected with one of the carriers. By changing the position of the brush it will be possible to adjust the moment of the engagement and thus the obtained voltage.

*Example*

A rationally constructed machine of the Toepler type possessed eight carrier electrodes each comprising five blades having an arcuate extent of about 45°. The outer diameter of the whole was 34 centimetres. In air compressed up to 30 atmospheres the minimum thickness of the dielectric separating an inductor from a carrier corresponds to a maximum potential difference of about 120 kilovolts which determines the choice of an output potential of 50 to 55 kilovolts in order to obtain the maximum output. By arranging, according to the invention, six inductors brought to potentials of $-70$, $-20$, $+30$, $+80$, $+130$ and $+180$ kilovolts respectively, it was possible to bring the output voltage up to 300 kilovolts with an output current of 0.9 milliampere for a speed of rotation of 1400 R. P. M., i. e. an output of 270 watts. The output voltage was multiplied by 6. For the energization of the inductors with the potentials $-70$ and $-20$ kilovolts a single auxiliary generator is used, which directly supplies the voltage of $-70$ kilovolts, the voltage of $-20$ kilovolts being obtained by means of a voltage divider of the resistor type. The other inductors are energized by the main machine by means of another voltage divider of the resistor type connected between the terminal at the potential 300 kilovolts and the ground.

Figure 2:
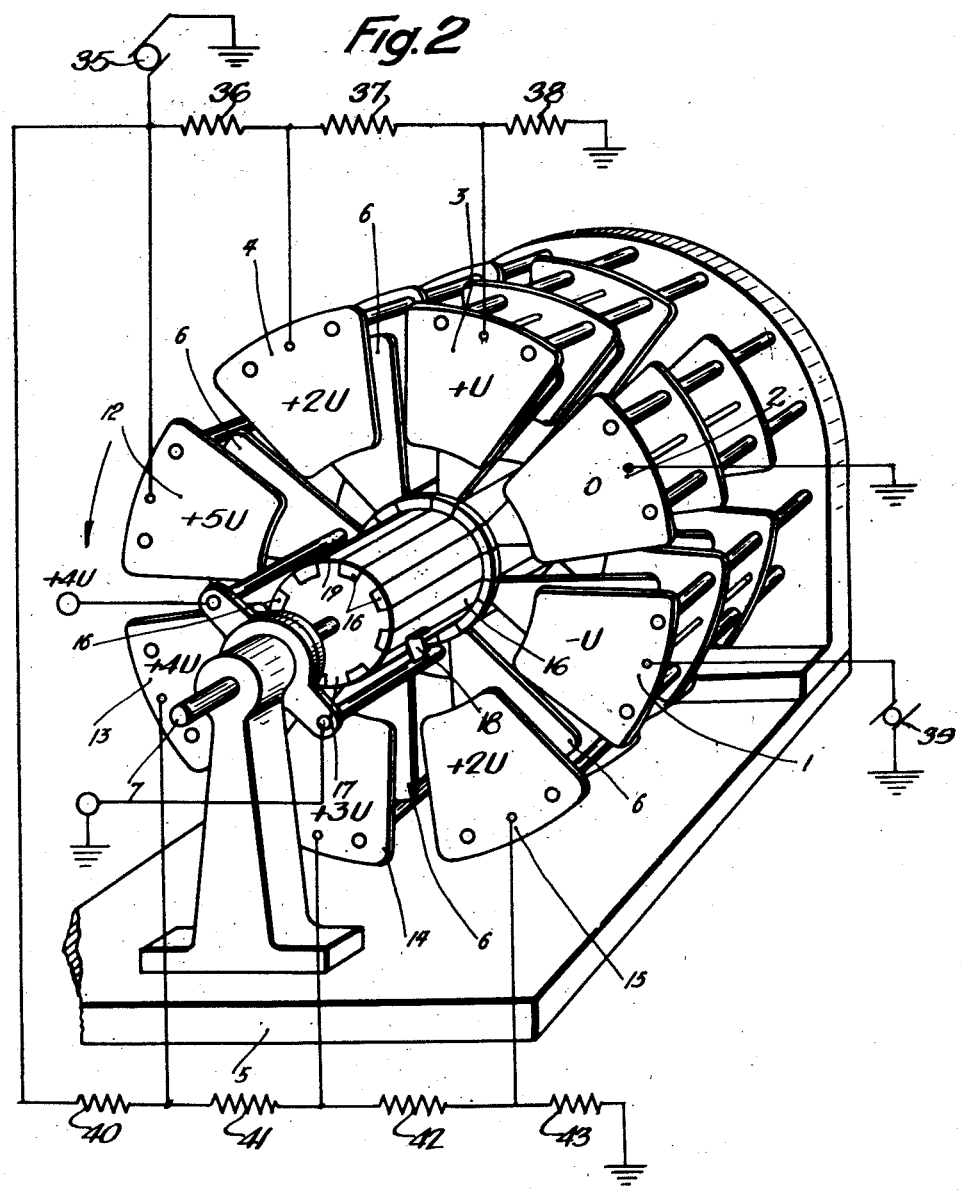
Fig. 2 is a similar view of a machine comprising two series of inductors maintained in the respective series at increasing and decreasing potentials.

The machine shown in Fig. 2 comprises eight inductors designated by reference numerals 1 to 4 and 12 to 15 and each formed of three parallel conducting blades mounted in an insulated manner on frame 5 of the machine and an equal number of carriers 6 each formed of two conducting sectors mounted in an insulated manner on shaft 7. As in the machine shown in Fig. 1 each carrier 6 is electrically connected with a contact bar or blade 16 extending on an insulating cylinder 17 keyed on shaft 7 along an arc corresponding to the arcuate extent of the electrode under consideration. Said blades 16 co-operate with brushes 18 and 19 secured in an insulated manner on frame 5 of the machine. Brush 18 is grounded and arranged so as to engage one blade 16 when the corresponding carrier engages between the blades of inductor 1. On the other hand, brush 19 is electrically connected with the collector or output terminal of the machine and arranged so as to engage a blade 16 shortly after the corresponding carrier has begun to move out of register with inductor 4, the movable parts turning counterclockwise, as shown by the arrow in Fig. 2.

The so constructed machine operates as a generator in the following manner:

$2U$ again standing for the maximum potential difference which can exist without discharge between an inductor and the nearest carrier, the inductors 1, 2, 3, 4 are brought as in Fig. 1, to the potentials $-U$, O, $+U$ and $+2U$, respectively, and the inductors 12, 13, 14, 15 to the potentials $+5U$, $+4U$, $+3U$ and $+2U$, respectively.

As shown in Fig. 2 the exciter 35, which may be a direct current generator capable of producing a potential of $+5U$ with respect to the ground, is connected to the inductor 12 to maintain this inductor at a potential $+5U$. This exciter is connected through the resistor 36 to the inductor 4 at a potential +2U and through the resistors 36 and 37 to the inductor 3 at potential +U and is further connected to ground through the resistor 38. The inductor 2 is connected directly to ground. The exciter 39 is connected between the inductor 1 and ground and is capable of producing a potential of −U with respect to ground so as to maintain the inductor 1 at a potential −U. Thus the inductors 1, 2, 3, 4 and 12 are maintained at successively greater potentials as above described.

The exciter 35 also is connected through the resistors 40, 41, 42, 43 to inductors 13, 14, 15 and to ground as shown in Fig. 2 to maintain the potentials of the inductors 13, 14 and 15 respectively at +4U, +3U and +2U.

The machine being rotated counter-clockwise, a carrier electrode engaging into inductor 1 receives a charge +Q which is approximately equal to C. U. and follows the cycle described with reference to Fig. 1 as regards its potential increase, said potential tending successively, on leaving the inductors 1, 2, 3 and 4, towards the values +U, +2U, +3U and +4U. When said potential reaches +4U, that is to say when the carrier under consideration has sufficiently moved out from inductor 4 and engaged into inductor 12, this carrier is put into connection with the collector or output terminal by means of the corresponding blade 16 and of brush 19 and said connection is maintained as long as the capacity formed of inductor 12 and the carrier increases, brush 19 being arranged accordingly. The quantity of electricity carried by the carrier electrode when entering the inductor 12 and +Q and, when the latter begins to move out from said inductor and its connection with the collector ceases, it is substantially −Q. The quantity of electricity which is supplied is, therefore, 2Q instead of Q; it has, therefore, been doubled.

The subsequent passage of the carrier electrode under consideration through inductors 13, 14 and 15 has for its effect to bring its potential progressively to zero again before this carrier begins again the cycle which has just been described. When the carrier is in registration with inductor 13 at the potential +4U its potential is +3U; when it registers with inductor 14 at potential +3U, its potential is +2U and so on. When the carrier has engaged sufficiently into inductor 1 at the potential −U, it is grounded and the cycle is repeated.

In a general manner, in order to obtain the potential difference $nU$ with the ground or between the terminals of the machine, it is possible to use a machine having $2n$ inductors or a multiple of $2n$.

Said inductors are then brought to the potentials −U, 0, +U, 2U ... $(n-3)U$, $(n-2)U$, $(n+1)U$, $nU$, $(n-1)U$ ... 3U, 2U, −U, 0, +U and so on respectively, the inductors being taken in the order in which they are engaged by one and the same carrier rotating in the generating direction.

It is also possible to choose for the inductors potentials which are not whole multiples of U. If the first inductor is brought to the potential −V instead of −U by defining a parameter $k$ through the equation $2U = kV + V$ it will be possible to bring the inductors taken in the same order as before to the potentials: −V, $kV$−V, $2kV$−V, $3kV$−V ... $(n-2)kV$−V, $(n-1)kV$−V, $nkV$+V, $(n-1)kV$+V, $(n-2)kV$+V ... $2kV$+V, $kV$+V, −V, $kV$−V, $2kV$−V ... and so on. The potential of a carrier will be 0, $kV$, $2kV$ ... $(n-1)kV$, $nkV$, $(n-1)kV$ ... $2kV$, $kV$, 0, $kV$ ..., so that the output voltage will be near $nkV$ instead of being $nU$, while the charge of a carrier will be ±C. V. instead of ±C. U. The output of the machine will depend upon the parameter $k$ as mentioned above.

It is also possible to add to all the potentials which have been indicated one and the same constant of any value.

The energization of the inductors may be obtained in a similar manner as provided for the machine shown in Fig. 1.

Example

A rationally constructed machine of the Toepler type had eight carrier electrodes each comprising five blades having an arcuate extent of about 45°. The diameter of the whole was 34 centimetres. In air compressed up to 30 atmospheres the minimum thickness of dielectric separating a carrier from an inductor corresponds to a maximum potential difference of about 120 kilovolts. By arranging, according to the invention, eight inductors with the potentials −70, −20, +30, +80, +270, +200, +170, +120 kilovolts the output voltage is about +200 kilovolts with a current of 2.3 milliamperes at the speed of rotation of 1400 R. P. M., that is, an output of 460 watts. By bringing the inductors to the potentials of −70, −20, +170, +120, −70, −20, +170, +120 kilovolts, another coupling of the machine is obtained in which the voltage is about 100 kilovolts, that is half that which the preceding coupling gave, but the current is 5.1 milliamperes for the same speed or an output of 510 watts. The output was slightly higher because the influence of the stray capacities was smaller.

The present invention applies not only to electrostatic generator machines having conducting carrier electrodes but also to all driving electrostatic machines or motors having conducting carrier electrodes. It is possible, for example, to cause the machine shown in Fig. 1 to work as a motor by bringing inductors 1, 2, 3, 4 to the potentials −U, 0, +U, +2U as previously and by supplying the electrical charge through the output terminal connected to the insulated brush 11 from a source supplying a potential of +4U with respect to the ground. The machine will work as a motor rotating in a direction opposite to that of the generator. The presence of the inductors 2, 3 and 4 at potentials 0, +U and +2U, in accordance with the present invention, makes it possible to feed the machine under the voltage 4U while the minimum thickness of the fluid dielectric separating an inductor from a carrier would require a feeding voltage of the order of only U if the invention were not applied.

Likewise, as regards the machine shown in Fig. 2, by supplying the electrical charge to brush 19 from a source supplying a potential +4U with respect to the ground and by bringing the inductors 1, 2, 3, 4, 12, 13, 14, 15 as previously to the potentials −U, 0, +U, +2U, +5U, +4U, +3U, +2U, the machine will work as a motor rotating in a direction opposite to that of the generator. Owing to the presence of inductor 12 at potential +5U, on the one hand, and to that of inductors 13, 14, 15 at the potentials +4U, +3U, +2U, on the other hand, the electrodes are submitted to the same electrostatic forces when their potential reduces from +4U to 0 as when it rises from 0 to +4U. There results therefrom an increase of the driving torque and, therefore, of driving power with equal speed. This increased driving power is accompanied by a corresponding increase of the current and, therefore, of the absorbed electric power.

In a general manner, all of the modes of application of the invention indicated for generator machines, such as, for instance, the values of the potentials, the number of carrier electrodes and inductors, are valid for motors.

Figure 4:
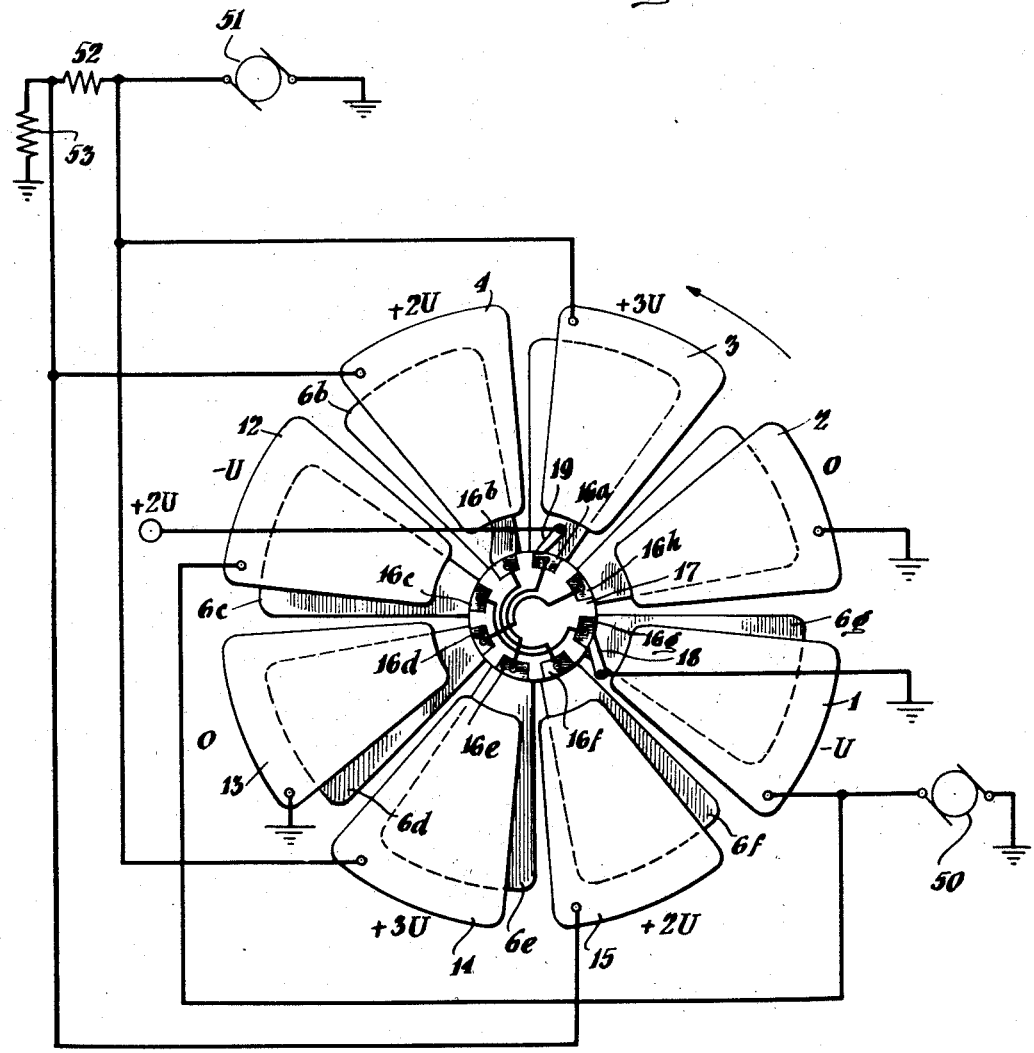
Fig. 4 is a diagrammatic elevational view of a machine similar to that of Fig. 2, but having a modified excitation arrangement.

One and the same machine may be coupled in various manners, yielding various voltages and currents, the supplied power remaining substantially the same. The machine shown in Fig. 2 may be modified, for example, as shown in Fig. 4 to bring the inductors to the potentials −U, 0, +3U, +2U, −U, 0, +3U, +2U; the voltage supplied across the brushes 18, 19 would then be 2U instead of 4U, but in compensation the available current would be twice that of the preceding coupling, for there are now two electrodes capable of delivering simultaneously. It would be necessary, of course, to add two complementary brushes or to join electrically, through suitable connections as shown in Fig. 4, the electrodes which, in the second type of coupling, are always at the same potential during operation.

The exciting means shown in Fig. 4 for maintaining the potentials in this modification comprises the exciter 50 connected between the inductors 1 and 12 and ground, this exciter being capable of maintaining these inductors at a potential −U with respect to ground. The exciter 51 is connected between the inductors 3 and 14 and ground and is capable of maintaining these inductors at a potential +3U with respect to ground. The exciter 51 also is connected through the resistor 52 to the inductors 4 and 15 to maintain these inductors at a potential of +2U. This exciter is further connected through the resistor 53 to ground. Inductors 2 and 13 are connected directly to ground.

What I claim is:

1. An induction electrostatic machine comprising rotating carrier electrodes electrically influenced by at least one normal inductor electrode and in which the said inductor electrode is followed, in the direction of rotation of the machine considered when working as a generator, by a series of auxiliary inductors connected to electrical supply means capable of conferring to said auxiliary inductors given potentials increasing from one auxiliary inductor to the next, in the above-mentioned direction of rotation, the potentials conferred by said supply means being such that the difference of potential between a carrier electrode and the nearest inductor remains not greater than the maximum consistent with the operation of the machine without discharge between said carrier electrode and said nearest inductor and that the potential of a carrier electrode when it comes out of coincidence with the last auxiliary inductor of said series which is at a potential less than the desired output potential is higher than the potential of said last auxiliary inductor, means being provided to connect each carrier electrode with the ground substantially when it begins to come into inductive relation to the normal inductor and for maintaining such connection substantially until it begins leaving registering inductive relation with said normal inductor and to connect said carrier electrode with the collecting terminal of the machine after it has begun to leave said last auxiliary inductor.

2. An induction electrostatic machine, comprising rotating carrier electrodes electrically influenced by at least one normal inductor electrode and in which the said inductor electrode is followed, in the direction of rotation of the machine considered when working as a generator, by a series of auxiliary inductors, all of said normal and auxiliary inductors, forming a total of $n$ inductors, being connected to electrical supply means capable of conferring to said inductors respectively potentials $-V, kV-V, 2kV-V \ldots (n-1)kV-V$ or said potentials increased by the same constant, V being the potential of the normal inductor electrode and V being such that $2U=kV+V$, 2U being the maximum difference of potential which may exist between a carrier electrode and the nearest inductor without discharge therebetween; and $k$ being a constant not greater than one and preferably equal to or close to one and depending on the relation of the output potential of the machine to the potential of said normal inductor, means being provided to connect each carrier electrode with the ground substantially when it begins to come into inductive relation to the normal inductor and for maintaining such connection substantially until it begins leaving registering inductive relation with said normal inductor and to connect said carrier electrode with the collecting terminal of the machine after it has begun to leave the last auxiliary inductor which is at a potential less than the desired output potential.

3. An induction electrostatic machine comprising rotating carrier electrodes electrically influenced by at least one normal inductor electrode and in which the said inductor electrode is followed, in the direction of rotation of the machine considered when working as a generator, by a first series of auxiliary inductors connected to electrical supply means capable of conferring to said auxiliary inductors given potentials increasing from one auxiliary inductor to the next in the above mentioned direction of rotation, the potentials conferred by said supply means being such that the difference of potential between a carrier electrode and the nearest inductor remains not greater than the maximum consistent with the operation of the machine without discharge between said carrier electrode and said nearest inductor and that the potential of a carrier electrode when it comes out of coincidence with the last auxiliary inductor of said series which is at a potential less than the desired output potential is higher than the potential of said last auxiliary inductor, said first series of auxiliary inductors being followed by a second series of auxiliary inductors connected to electrical supply means capable of conferring to said auxiliary inductors of said second series given potentials decreasing from one inductor to the next, the first inductor of said second series being arranged so as to exert its influence upon each carrier electrode at the time when said carrier electrode is brought into connection with the collecting pole of the machine and the potential conferred to said first inductor of said second series by the supply means connected thereto being such that said inductor attracts from the carrier electrodes while connected to said connecting pole electricity of a sign opposed to that which is collected by the collector, means being provided to connect each carrier electrode with the ground substantially when it begins to come into inductive relation to the normal inductor and for maintaining such connection substantially until it begins leaving registering inductive relation with said normal inductor and to connect said carrier electrode with the collecting terminal of the machine after it has begun to leave said last auxiliary inductor of said first series.

4. An induction electrostatic machine, comprising rotating carrier electrodes electrically influenced by at least one normal inductor electrode and in which the said inductor electrode is followed, in the direction of rotation of the machine considered when working as a generator, by a series of auxiliary inductors, all of said normal and auxiliary inductors, forming a total of $2n$ inductors, being connected to electrical supply means capable of conferring to said inductors respectively potentials $-V$, $kV-V$, $2kV-V$ ... $(n-1)$ $kV-V$, $nkV+V$, $(n-1)kV+V$ ... $2kV+V$, $kV+V$, or said potentials increased by the same constant, $-V$ being the potential of the normal inductor electrode and V being such that $2U=kV+V$, $2U$ being the maximum difference of potential which may exist between a carrier electrode and the nearest inductor without discharge therebetween; and $k$ being a constant not greater than one and preferably equal to or close to one and depending on the relation of the output potential of the machine to the potential of said normal inductor, means being provided to connect each carrier electrode with the ground substantially when it begins to come into inductive relation to the normal inductor and for maintaining such connection substantially until it begins leaving registering inductive relation with said normal inductor and to connect said carrier electrode with the collecting terminal of the machine after it has begun to leave the $(n-1)$th auxiliary inductor.

5. An induction electrostatic machine comprising rotating carrier electrodes electrically influenced by at least one normal inductor electrode and in which the said inductor electrode is followed, in the direction of rotation of the machine considered when working as a generator, by a series of auxiliary inductors, all of said normal and auxiliary inductors being connected to auxiliary generators capable of conferring to said normal inductor and to said auxiliary inductors given potentials increasing from said normal inductor and then from one auxiliary inductor to the next in the above mentioned direction of rotation, the potentials thereby conferred to said inductors being such that the difference of potential between a carrier electrode and the nearest inductor remains not greater than the maximum consistent with the operation of the machine without discharge between said carrier electrode and said nearest inductor and that the potential of a carrier electrode after it comes out of coincidence with the last auxiliary inductor which is at a potential less than the desired output potential is higher than the potential of said last auxiliary inductor, and means for connecting said carrier electrode at said higher potential to the collecting terminal of the machine.

6. An induction electrostatic machine comprising rotating carrier electrodes electrically influenced by at least one normal inductor electrode and in which the said inductor electrode is followed, in the direction of rotation of the machine considered when working as a generator, by a series of auxiliary inductors, all of said normal and auxiliary inductors being connected to at least one auxiliary generator through at least one voltage divider of the resistor type, said auxiliary generator and said voltage divider being arranged to confer to said normal inductor and to said auxiliary inductors given potentials increasing from said normal inductor and then from one auxiliary inductor to the next in the above mentioned direction of rotation, the potentials thereby conferred to said inductors being such that the difference of potential between a carrier electrode and the nearest inductor remains not greater than the maximum consistent with the operation of the machine without discharge between said carrier electrode and said nearest inductor and that the potential of a carrier electrode after it comes out of coincidence with the last auxiliary inductor which is at a potential less than the desired output potential is higher than the potential of said last auxiliary inductor, and means for connecting said carrier electrode at said higher potential to the collecting terminal of the machine.

7. An induction electrostatic machine comprising rotating carrier electrodes electrically influenced by at least one normal inductor electrode and in which the said inductor electrode is followed, in the direction of rotation of the machine considered when working as a generator, by a series of auxiliary inductors, all of said normal and auxiliary inductors being connected to the terminals of the machine through at least one voltage divider of the resistor type arranged to transfer to said normal inductor and to said auxiliary inductors given potentials increasing from said normal inductor and then from one auxiliary inductor to the next in the above mentioned direction of rotation, the potentials thereby conferred to said inductors being such that the difference of potential between a carrier electrode and the nearest inductor remains not greater than the maximum consistent with the operation of the machine without discharge between said carrier electrode and said nearest inductor and that the potential of a carrier electrode after it comes out of coincidence with the last auxiliary inductor which is at a potential less than the desired output potential is higher than the potential of said last auxiliary inductor, and means for connecting said carrier electrode at said higher potential to the collecting terminal of the machine.

8. An induction electrostatic machine comprising rotating carrier electrodes electrically influenced by at least one normal inductor electrode and in which the said inductor electrode is followed, in the direction of rotation of the machine considered when working as a generator, by a series of auxiliary inductors, all of said normal and auxiliary inductors being connected to carrier electrodes of the machine through connections arranged to transfer to said auxiliary inductors given potentials increasing from said normal inductor and then from one auxiliary inductor to the next in the above mentioned direction of rotation, the potentials thereby conferred to said inductors being such that the difference of potential between a carrier electrode and the nearest inductor remains not greater than the maximum consistent with the operation of the machine without discharge between said carrier electrode and said nearest inductor and that the potential of a carrier electrode after it comes out of coincidence with the last auxiliary inductor which is at a potential less than the output potential of the machine is higher than the potential of said last auxiliary inductor, and means for connecting said carrier electrode at said higher potential to the collecting terminal of the machine.

9. An induction electrostatic machine comprising a carrier electrode supported for rotation upon an axis, a plurality of inductor electrodes supported so as to be arranged in series circumferentially about said axis and so that said carrier electrode in the rotation thereof successively is brought into registering inductive relation to said inductor electrodes, means for maintaining said inductor electrodes respectively at predetermined potentials increasing in succession from one inductor electrode to the next in the direction of rotation of said rotating carrier electrode, means for initially determining the potential of said carrier electrode when in registering inductive relation to the inductor electrode which is at lowest potential at a potential greater than the potential of said lowest potential inductor electrode, whereby the potential of said carrier electrode is successively increased as said carrier electrode comes into register with the successive inductor electrodes, an output terminal of the machine, and means for connecting said carrier electrode to said output terminal after said carrier electrode has moved out of registering inductive relation to a predetermined inductor electrode which is at higher potential than said inductor electrode of lowest potential and the potential of said carrier electrode has increased to a potential higher than the potential of said predetermined inductor electrode.

10. An induction electrostatic machine as defined in claim 9 in which said means for connecting said carrier electrode to said output terminal of the machine is adapted to effect said connection when the potential of said carrier electrode which has moved out of registering inductive relation to said predetermined inductor electrode has increased substantially to the potential of said output terminal of the machine.

11. An induction electrostatic machine as defined in claim 9 in which said carrier electrode is in insulated relation to said inductor electrodes in the positions of said carrier electrode intermediate between and including the positions of registering inductive relation to said inductor electrode of lowest potential and of registering inductive relation to said predetermined inductor electrode of higher potential.

12. An electrostatic machine comprising conductive inductor members and conductive carrier members supported and arranged for relative movement between said inductor members and said carrier members in a predetermined path, an output terminal for said machine, said inductor members being arranged in succession in spaced relation to each other in the direction parallel to said path of movement, said carrier members being arranged in succession in spaced relation to each other in the direction parallel to said path and having an extent in said direction greater than the space between said inductor members, means for maintaining a first of said inductor members at a potential lower than the desired output potential of the machine, means for maintaining a second of said inductor members spaced along said path from said first inductor member at a potential higher than said desired output potential of said machine, means for maintaining a third of said inductor members located along said path between said first and second inductor members at a potential higher than that of said first inductor member but lower than said desired output potential, means for establishing the potential of each carrier member when it is at least in part in face to face relation to said first inductor member at a value greater than the potential of said first inductor member and less than said output terminal potential, and means for connecting said carrier members in succession to said output terminal of said machine when said carrier members respectively are at least in part in face to face relation to said second inductor member and at least in part in face to face relation to said third inductor member.

13. An electrostatic machine comprising conductive inductor members and conductive carrier members supported and arranged for relative movement between said inductor members and said carrier members in a predetermined path, an output terminal for said machine, said inductor members being arranged in succession in spaced relation to each other in the direction parallel to said path of movement, said carrier members being arranged in succession in spaced relation to each other in the direction parallel to said path and having an extent in said direction greater than the space between said inductor members, means for maintaining a first of said inductor members at a potential lower than the desired output potential of the machine, means for maintaining a second of said inductor members spaced along said path from said first inductor member at a potential higher than said desired output potential of said machine, means for maintaining a series of said inductor members located along said path between said first and second inductor members at potentials which are higher than that of said first inductor member but lower than said desired output potential and which are successively greater in the direction of movement of the carrier members relative to the inductor members, means for establishing the potential of each carrier member when it is at least in part in face to face relation to said first inductor member at a value greater than the potential of said first inductor member and less than said output terminal potential, and means for connecting said carrier members in succession to said output terminal of said machine when said carrier members respectively are at least in part in face to face relation to said second inductor member and at least in part in face to face relation to the inductor member which is at the highest potential of said series.

14. An induction electrostatic machine comprising a plurality of inductor electrodes and a carrier electrode supported and arranged for relative movement of said inductor electrodes and said carrier with respect to each other in a predetermined path, said inductor electrodes being arranged in succession in spaced relation to each other in the direction parallel to said path of relative movement so that said carrier electrode successively is brought into and out of registering inductive relation to said inductor electrodes, means for maintaining said inductor electrodes respectively at predetermined potentials increasing from one inductor electrode to the next in the direction of movement of said carrier electrode with respect to said inductor electrodes, means for initially determining the potential of said carrier electrode when brought at least in part into inductive relation to the inductor electrode which is at lowest potential at a potential greater than said lowest potential but less than the desired output potential of the machine, an output terminal of the machine, means for connecting said carrier electrode to said output terminal at a selected point in the movement of said carrier electrode out of registering inductive relation to a predetermined inductor electrode which is at a potential intermediate between the lowest potential and the highest potential of said succession of inductor electrodes, the potential of said carrier electrode at said selected point being higher than the potential of said predetermined inductor electrode but less than said highest potential.

15. An induction electrostatic machine as defined in claim 14 in which at said point of connection of said carrier electrode to said output terminal said carrier electrode is in part in inductive relation to said predetermined inductor electrode and in part in inductive relation to said inductor electrode at highest potential.

NOEL FELICI.

REFERENCES CITED

The following references are of record in the file of this patent:

UNITED STATES PATENTS

| Number | Name | Date |
|---|---|---|
| 479,941 | Henry | Aug. 2, 1892 |

Certificate of Correction

September 26, 1950

Patent No. 2,523,689

NOEL FELICI

It is hereby certified that error appears in the printed specification of the above numbered patent requiring correction as follows:

Column 4, line 30, for "C. U., C" read $C.U, C$; column 7, line 21, for "C. U." read $C.U$; line 37, for "and", first occurrence, read *was*; column 10, line 15, for "V being" read *-V being*; lines 71 and 72, for "connecting" read *collecting*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*